(12) United States Patent
Sundararajan

(10) Patent No.: US 8,205,890 B2
(45) Date of Patent: Jun. 26, 2012

(54) RESILIENT HIGH PRESSURE METAL-TO-METAL SEAL AND METHOD

(75) Inventor: Alagarsamy Sundararajan, Katy, TX (US)

(73) Assignee: Worldwide Oilfield Machine, Inc., Houston, TX (US)

(*) Notice: Subject to any disclaimer, the term of this patent is extended or adjusted under 35 U.S.C. 154(b) by 753 days.

(21) Appl. No.: 12/169,078

(22) Filed: Jul. 8, 2008

(65) Prior Publication Data

US 2010/0007097 A1 Jan. 14, 2010

(51) Int. Cl.
*E21B 33/128* (2006.01)
*F16L 5/02* (2006.01)
*F16J 15/02* (2006.01)

(52) U.S. Cl. .......................... 277/339; 277/607; 277/647
(58) Field of Classification Search .................. 277/339, 277/607, 621, 626, 630, 637, 644, 647, 649
See application file for complete search history.

(56) References Cited

U.S. PATENT DOCUMENTS

| | | | |
|---|---|---|---|
| 1,323,660 A | 12/1919 | Thrift | |
| 3,104,121 A | 9/1963 | Nordin et al | |
| 3,166,345 A | 1/1965 | Pinkard | |
| 3,337,223 A * | 8/1967 | Nusbaum | 277/529 |
| 3,378,269 A * | 4/1968 | Castor | 277/336 |
| 3,494,638 A | 2/1970 | Todd et al | |
| 3,915,462 A * | 10/1975 | Bruns et al. | 277/647 |
| 4,056,272 A | 11/1977 | Morrill | |
| 4,178,020 A * | 12/1979 | Dopyera | 285/18 |
| 4,190,270 A | 2/1980 | Vanderford | |
| 4,455,040 A | 6/1984 | Shinn | |
| 4,771,832 A | 9/1988 | Bridges | |
| 4,787,642 A * | 11/1988 | Etheridge | 277/550 |
| 4,878,651 A | 11/1989 | Meyer, Jr. | |
| 4,911,245 A | 3/1990 | Adamek et al. | |
| 5,129,660 A * | 7/1992 | Taylor et al. | 277/328 |
| 5,174,376 A | 12/1992 | Singeetham | |
| 5,199,497 A * | 4/1993 | Ross | 166/381 |
| 5,224,715 A * | 7/1993 | Downes et al. | 277/322 |
| 5,246,236 A * | 9/1993 | Szarka et al. | 277/337 |
| 5,257,792 A | 11/1993 | Putch et al. | |
| 5,542,475 A * | 8/1996 | Turner et al. | 166/387 |
| 6,260,822 B1 | 7/2001 | Puranik | |
| 6,279,875 B1 | 8/2001 | Chatufale | |
| 6,575,426 B2 | 6/2003 | Sundararajan | |
| 6,601,650 B2 | 8/2003 | Sundararajan | |
| 6,609,533 B2 | 8/2003 | Sundararajan | |
| 6,684,897 B2 | 2/2004 | Sundararajan | |
| 6,869,079 B2 * | 3/2005 | Zheng | 277/511 |
| 6,966,537 B2 | 11/2005 | Sundararajan | |
| 7,040,408 B2 | 5/2006 | Sundararajan et al. | |
| 7,578,349 B2 | 8/2009 | Sundararajan et al. | |
| 7,770,899 B1 * | 8/2010 | Durham | 277/603 |
| 2005/0082829 A1 | 4/2005 | Dallas | |

* cited by examiner

Primary Examiner — Vishal Patel
(74) Attorney, Agent, or Firm — Kenneth L Nash (57) ABSTRACT

A high pressure metal-to-metal seal utilizes an expandable metal seal element able to withstand caustic fluids, high pressure, and high temperature. The metal-to-metal seal assembly is resilient for repeatable sealing and comprises an energizing metal ring and a metal sealing ring. Engagement of these two rings expands surfaces of the metal sealing ring to create inner and/or outer metal-to-metal seals.

12 Claims, 5 Drawing Sheets

RESILIENT HIGH PRESSURE METAL-TO-METAL SEAL AND METHOD

BACKGROUND OF THE INVENTION

1. Field of the Invention

The present invention relates generally to metal-to-metal seals and, more particularly, to a resilient metal-to-metal seal that in one embodiment may be mounted in a wellhead or BOP to control very high pressures, high temperature, and caustic fluids.

2. Description of the Prior Art

Metal-to-metal seals have advantages over non-metallic seals in that they operate over a wider range of temperatures, fluids, and pressures. Non-metallic seals of various materials are best matched to a particular range of temperatures, fluids, and pressures. Neither the operator nor the manufacturer will always know the conditions under which wellhead devices may be utilized, which increases the risk of failure.

In the past, metal-to-metal seals have often been made of soft metals that deform to create a one-time-use seal. One of the problems of soft metal seals is that all seals must be replaced whenever the wellhead device is opened. The deformed material is unlikely to seal again when used more than once. Another problem is that these types of seals do not always make an initial seal, thereby necessitating opening up the wellhead device and replacing that seal as well as all other metal seals.

To the extent that hard metal-to-metal seals are utilized in the prior art, fine tolerances are often required that essentially limit the pressure that can be sealed. Moreover, small variations in the tolerances can render the seal ineffective.

To the extent resilient metal seals have been utilized, they are subject to problems in obtaining an initial seal and/or maintaining a seal with over wide pressure variations.

The following U.S. patents describe various prior art efforts related to making metal-to-metal seals:

U.S. Pat. No. 4,911,245, issued Mar. 27, 1990, to Adamek et al, discloses a metal seal for sealing against casing in a well with a plurality of circumferentially axially spaced metal bands. An inlay material partially fills the cavities located between the metal bands. The metal bands are soft enough to deform when the seal is pressed into contact with the casing. The bands deform to a point flush with the inlay material. If the casing later moves axially relative to the seal because of temperature change or tension loading, then the inlay material will wipe across the band faces to maintain the seal.

U.S. Pat. No. 5,257,792, issued Nov. 2, 1993, to Putch et al, discloses a metal well head seal for sealing between inner and outer concentric well head components which includes a circular metal seal having a flat end and a tapered end and positioned between the inner and outer components. A forcing cone on one of the components engages the tapered end for sealing, a backup shoulder engages the flat end as the inner and outer components are longitudinally moved together for setting the metal seal. An adjusting nut adjusts the tolerances between the tapered end and the forcing cone.

U.S. Pat. No. 4,771,832, issued Sep. 20, 1988, to Bridges, discloses a wellhead assembly with a metal seal that accommodates misalignment between casing and the bore of the wellhead housing. The metal seal assembly includes a metal seal ring and a wedge ring. The seal ring has a cylindrical inner wall and a conical outer wall. The centerlines of the inner and outer walls are offset with respect to each other, making the ring eccentric. Similarly, the wedge ring has a conical inner wall and an outer wall. Its inner and outer walls are offset with respect to each other. The rings can be rotated relative to each other and to the casing to coincide the axis of the outer wall of the wedge ring with the axis of the wellhead housing bore. The inner wall of the seal ring has protruding bands which deform as a result of the softness of the metal to enhance sealing.

U.S. Pat. No. 3,166,345, issued Jan. 19, 1965, to Pinkard, discloses an improved sealing means including a seal ring, sealing between the cylindrical, upwardly extending neck of a tubing hanger element positioned in a tubing head, and a recess or socket of a bonnet flange, which is positioned over the upwardly extending cylindrical neck of the tubing hanger.

U.S. Pat. No. 4,455,040, issued Jun. 19, 1984, to Shinn, discloses a tubing head, tubing head adapter and tubing hanger sealed against annulus fluid or downhole pressure by an upper and a lower, pressure-energizing sealing assembly. The sealing assemblies are bi-directional, pressure-energizing and operate under working pressures of up to 30,000 psi. Each assembly consists of a metal seal ring made of highly elastic and ductile 316 stainless steel with a yield strength of approximately 30,000 psi, having a frustoconical shape, with the upper and lower tips of the cone enclosing an angle of approximately 28.degree. in the prestressed state. In the axial direction, the seal ring engages a support ring on one end and a tubing hanger shoulder at the other end, both of which form inclines of 30 degrees with the vertical (radial) plane. The support ring and the tubing hanger shoulders are made of materials having yield strengths of 50,000 psi and 75,000 psi, respectively. The preload applied to the seal assemblies is such that the seal ring plastically conforms to the harder surrounding surfaces and assumes a cone taper angle of 30 degree, in conformity with the mating support ring and tubing hanger shoulder. Thereafter, working pressure applied from either axial direction will be resolved along the incline of interacting surfaces into radial components which further enhance the sealing pressure along the inner and outer sealing surfaces. Because of this bidirectional pressure-enhancement, both seal assemblies may be tested through the application of test pressure from one common test port located between the two assemblies.

U.S. Pat. No. 4,056,272, issued Nov. 1, 1977, to Morrill, discloses an oil well pipe suspension apparatus including a wellhead having a pipe hanger supported therein and a Christmas tree supported thereon, a frusto-conical metal gasket providing a metal-to-metal seal between the hanger and the wellhead, and an "X" cross section resilient metal gasket providing a metal-to-metal seal between the hanger and the Christmas tree.

U.S. Patent Application No. 20050082829, published Apr. 21, 2005, to Dallas, discloses a metal ring gasket for a threaded union with a high-pressure, fluid-tight, metal-to-metal seal between subcomponents of a fluid conduit. The metal ring gasket is made of carbon steel or stainless steel depending on a composition of the fluid to be conveyed through the conduit. The metal ring gasket has beveled corners and is received in a beveled annular groove on mating surfaces of the subcomponents of the threaded union. When compressed in the annular groove between the subcomponents, the metal ring gasket creates an energized, high-pressure, fluid-tight seal that is highly resistant to pressure and is capable of maintaining a seal even at elevated temperatures resulting from direct exposure of the fluid conduit to fire.

U.S. Pat. No. 4,190,270, issued Feb. 26, 1980, to Vanderford, discloses a hanger for supporting tubing in a well head including a tubular body adapted for connection to a casing head and having a tapered and upwardly facing seat, a tubular hanger positioned within the body and supported on the seat, a downwardly converging annular space between facing portions on the exterior of the hanger and on the interior of the body, a metal seal ring positioned within the converging space, a seal actuator sleeve positioned between the hanger and the body and being movable axially to engage the seal ring, and a wedging screw extending through the body. The wedging screw engages the seal actuator sleeve and wedges the seal actuator sleeve onto the seal whereby the seal is forced into sealing engagement in the converging space between the hanger and the body.

U.S. Pat. No. 3,104,121, issued Sep. 17, 1963, to Nordin et al, discloses a seal assembly designed to withstand pressures such as those encountered at high pressure well heads which may be in the order of 20,000 p.s.i. A high pressure seal assembly for a flow control device, wherein the assembly includes co-acting surfaces between the flow control device and the main body for accommodating a seal structure to provide an improved seal equally effective against pressure applied from either direction.

U.S. Pat. No. 3,494,638, issued Feb. 10, 1970, to Todd et al, discloses a tubing hanger assembly including an adapter and seal assembly, mounted between the tubing head and the valve fitting at the top of a well, with the seal assembly being mounted in the bore of the adapter body, and held therein by a removable retaining nut and with the addition of a liquid seal injection valve communicating with the seal therein and a test port through the wall of the adapter for receiving a gauge for testing the seal prior to installing the adapter on the tubing head.

The solutions to the above described and/or related problems have been long sought without success. Consequently, those of skill in the art will appreciate the present invention, which addresses the above problems and other significant problems uncovered by the inventor that are discussed hereinafter.

SUMMARY OF THE INVENTION

It is a general purpose of the present invention to provide an improved metal seal assembly and method.

An object of the present invention is to provide an improved high pressure sealing assembly and method that may be utilized in pressure control equipment such as wellheads and BOPs.

Accordingly, the present invention provides a resilient and/or flexible metal seal that may be utilized without deformation. In one embodiment, a seal ring comprises seal members that are pliable, and which may be bent repeatedly within their range of operation without injury or damage. The metal seal comprises a metal seal ring that is capable of returning to an original shape or position after having been compressed. Unlike many metal seals, the metal seal assembly components of an embodiment of the present invention may be taken apart and when put back together will seal.

The apparatus in accord with one possible embodiment of the invention may comprise an energizing metal ring comprising metal energizing surface(s). The metal energizing surface(s) engage a groove in the metal sealing ring. When the metal energizing surfaces are urged into engagement with the metal groove of the metal sealing ring, one or both of an inner metal surface and an outer metal surface expand outwardly to increase the seal pressure applied by sealing surfaces. In this way, the present invention may be utilized to produce metal-to-metal seals, such as inner metal-to-metal seal and/or an outer metal-to-metal seal.

The apparatus may comprise forming an undercut portion which may be positioned at a mid-section of the metal sealing ring. The undercut portion decreases the thickness of at least one metal wall on which the sealing surfaces are formed to thereby increase flexibility of the inner metal member and/or the outer metal member.

The apparatus may comprise an initial seal mechanism positioned to engage the energizing metal ring and/or the metal sealing ring to form an initial metal-to-metal seal.

The apparatus may further comprise the initial seal mechanism comprising at least one threaded member and/or a third metal ring. The third metal ring may be a spacer ring sized to produce the initial metal-to-metal seal when engaging the energizing metal ring and/or the metal sealing ring. An inner and/or outer seal ring may be mounted on the third metal ring.

In one embodiment, the one or more metal energizing surfaces on the energizing metal ring or elsewhere can comprise one or more wedging surfaces such as a conical wedging surface and/or a flat wedging surface when viewed in a cross-section.

In another embodiment, the apparatus may comprise one or more protrusions mounted on the inner metal surface and/or the outer metal surface of the metal sealing ring wherein the line-of-contact metal-to-metal seals are produced by engagement with the protrusions. A protrusion may comprise rounded surfaces which engage surfaces such as inner and/or outer metal tubular surfaces. In one embodiment, the inner and/or outer metal tubular surfaces may comprise an annulus or pocket within pressure control equipment such as a BOP or wellhead.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Figure 1:
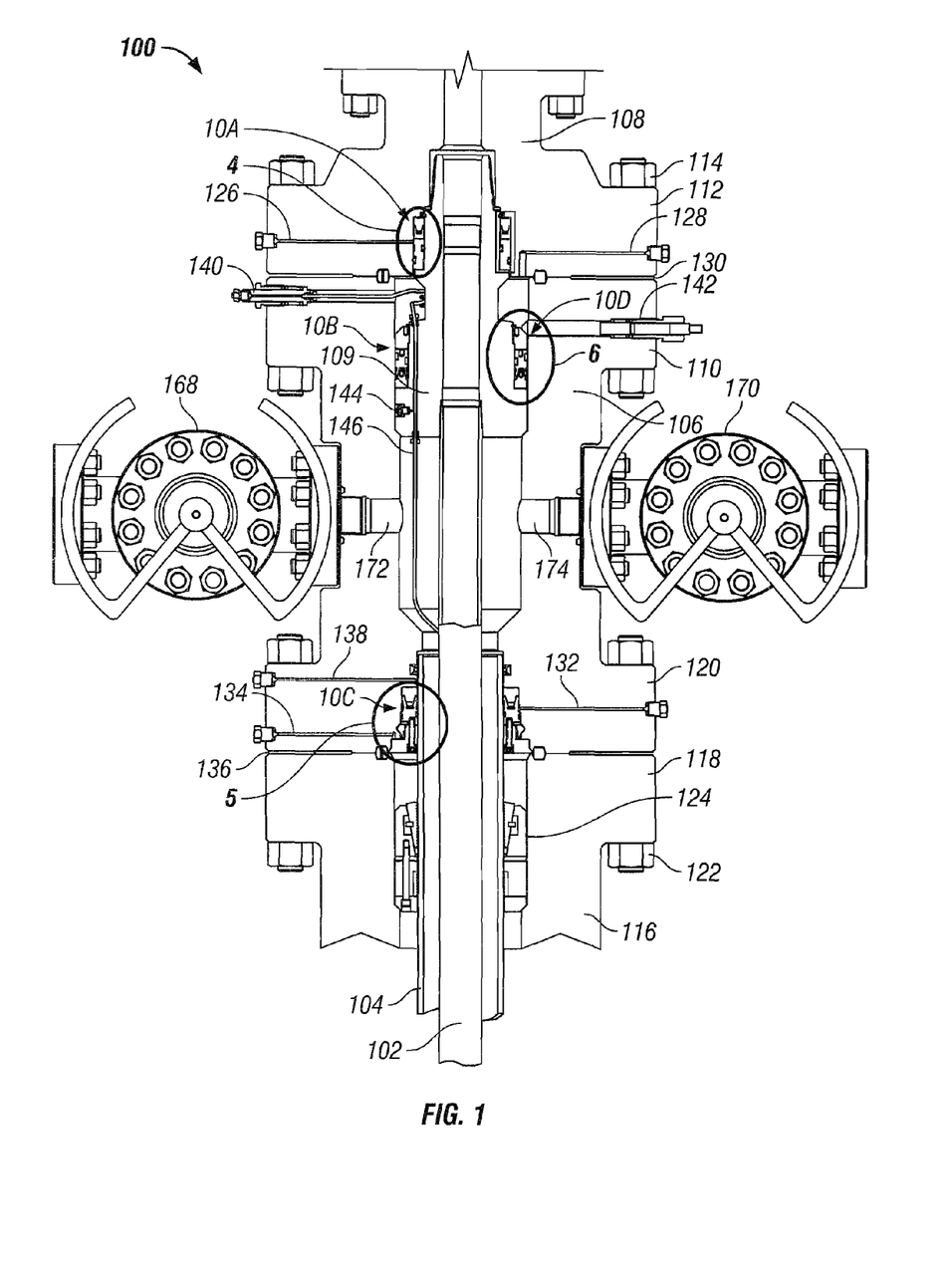
FIG. 1 is an elevational view of a wellhead device that shows metal-to-metal seals utilized within a wellhead device in accord with one possible embodiment of the present invention.

Referring now to the drawings and more particularly to FIG. 1, there is shown pressure control equipment 100 that is intended to be representative of various types of wellhead equipment, which may comprise wellheads, tubing assemblies, BOP's, spool assemblies, hanger assemblies, and the like. The present invention is not limited to use in pressure control equipment or to any particular pressure control equipment. Moreover, pressure control equipment 100 may comprise various additional components that are not shown.

Pressure control equipment 100 can be utilized to seal off a well to control fluids such as liquids and gasses. The fluids may be at high pressures or low pressures, may comprise a wide range of different fluids including acidic and caustic fluids, and may operate under a wide range of temperatures. In one embodiment of the present invention, a metal-to-metal sealing mechanism in accord with the present invention may be utilized to control pressures up to 30,000 psi for a wide range of fluids and temperatures.

Sealing assemblies in accord with embodiments of the present invention are shown at 10A, 10B, 10C, and 10D. In this embodiment, sealing assemblies 10B and 10D are actually the same assembly but are shown in different views that include different components. However, conceivably the components of 10B and 10D might be utilized in separate seal ring assemblies and are therefore referred to separately to show multiple possibilities. Various components applicable to sealing assemblies 10A, 10B, 10C, and 10D are also shown in greater detail in FIG. 2 and FIG. 3. The embodiments of 10A, 10C and 10D with surrounding features of pressure equipment 100 are shown enlarged in FIG. 4, FIG. 5, and FIG. 6 respectively. These components are discussed in greater detail hereinafter.

Pressure control equipment 100 may be utilized to control pressure in tubing 102 and casing 104, which may be at different pressures, contain different fluids, and be at different temperatures. For example, tubing 102 may be under very high pressure, perhaps 30,000 psi while casing 104 might be under a relatively much lower pressure, such as 500 psi, atmospheric pressure, or even a vacuum. Different fluids and temperatures may also be present. The present invention is operable to control the fluids of different pressures, types of fluids, and temperatures.

As general background for pressure control equipment 100, tubing head spool assembly 106 may be secured to tubing head adapter assembly 108 at flanges 110 and 112 by connectors such as stud/nut assemblies 114. Tubing hanger 109 is secured within tubing head adapter assembly 108. Tubing string 102 is supported by tubing hanger 109. An end of tubing 102 may be threadably secured to tubing hanger 109 which is supported by internal shoulders within tubing head spool assembly 106.

Casing hanger assembly 116 is secured to tubing head spool assembly 106 at flanges 118 and 120 by stud/nut assemblies 122. Casing slip hanger assembly 124 secures casing 104 within casing hanger assembly 116. Lockdown screw assembly 142 may be utilized for securing into position internal components of tubing head spool assembly 106. Lockdown screw assembly 142 may also be utilized to provide energizing force for sealing assembly 10D (and 10C).

Various ports may be utilized for monitoring/testing seals in pressure control equipment 100, for instance, to verify that the seals are not leaking. Seal monitor ports 126 and 132 may be utilized, for example, to monitor pressure at seal assembly 10A and 10C, respectively. Flange test ports 128 and 134 may be utilized for example, to monitor or perhaps inject test pressure at flange joints 130 and 136, respectively. Pressures and other seals may be tested utilizing ports such as port 133. Terminating sleeve assembly 140 may also be utilized for control lines and/or monitoring and/or testing pressures. Other pressure/control lines and/or test ports such as port 144 and control lines 146 and/or other related components may also be utilized, as desired. Outlet wing valves 168 and 170 may be utilized to control flow through outlets 172 and 174, respectively.

Figure 2:
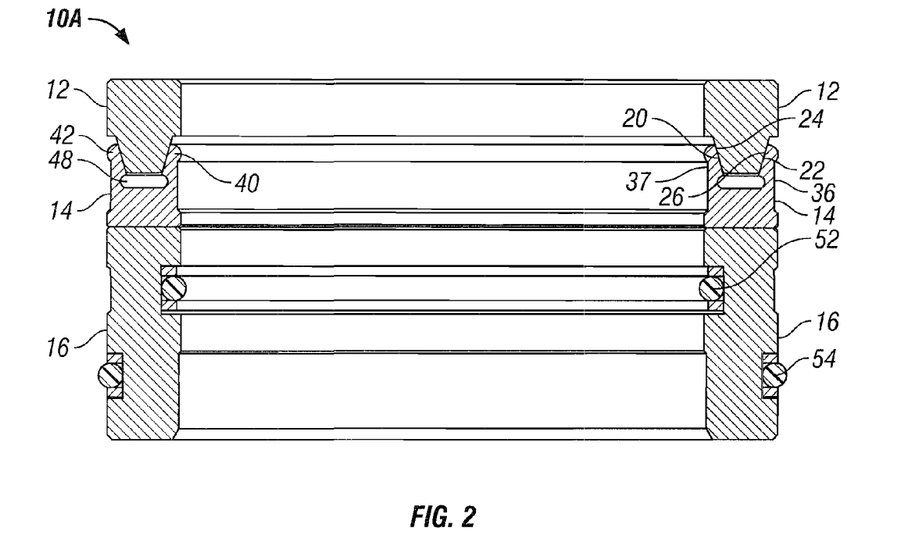
FIG. 2 is an elevational view, partially in cross-section, that shows a metal-to-metal seal assembly in accord with one possible embodiment of the present invention.
Figure 3:
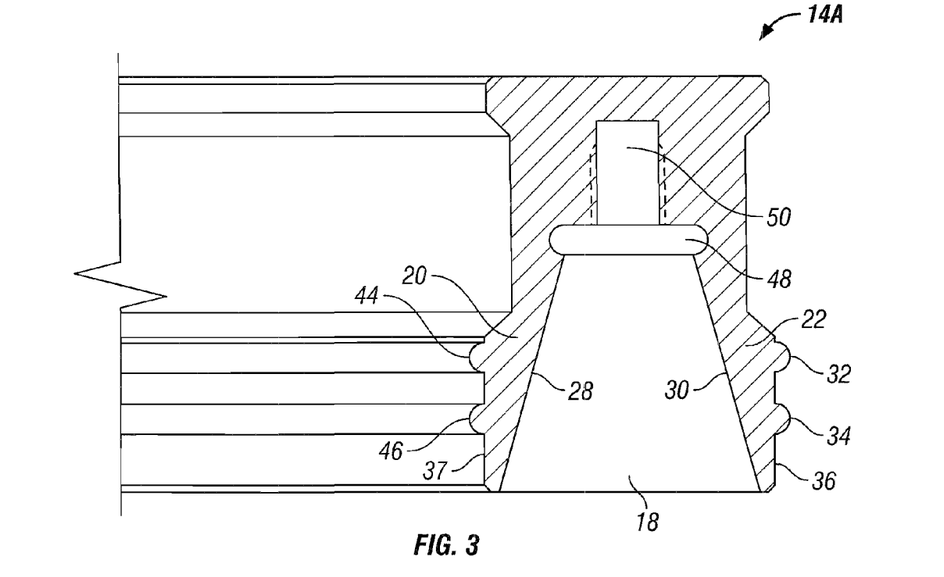
FIG. 3 is an elevational view, partially in cross-section, that shows a resilient expandable metal-to-metal sealing ring in accord with one possible embodiment of the present invention.

Referring now to FIG. 2, there is shown one embodiment of enlarged metal-to-metal sealing assembly 10A. In this embodiment, metal-to-metal sealing assembly 10A may comprise energizing ring 12, seal ring 14, and spacer ring 16. In FIG. 3, another embodiment of a seal ring, namely seal ring 14A is shown, which is inverted as compared to seal ring 14 shown in FIG. 2. In practice, seal ring assemblies 10A, 10B, 10C, and 10D may be mounted inverted or not, as is considered most suitable to the particular application. The seal ring assemblies seal in both directions.

In general operation, metal-to-metal sealing assembly 10A produces an initial seal but is also responsive to a differential pressure applied across the assembly. If necessary and/or desired, the sealing force created may increase with increasing pressure and decreases with decreasing pressure. Due to the flexibility and relative movement of the sealing assembly components of the present invention, high tolerances are not required to provide a reliable hard metal-to-metal seal at high pressures. Pressure may be two-way and may be applied on either side of sealing ring 14.

Spacer ring 16 is relatively movable with respect to sealing ring 14. If pressure is applied to spacer ring 16, then spacer ring 16 is urged against sealing ring 14 whereupon metal-to-metal sealing assembly 10A responds to thereby increase the sealing force. If pressure against spacer ring 16 is relaxed, then spring pressure of inner and outer wings 20 and 22 may urge spacer ring 16 away from sealing ring 14.

However, in the embodiment shown in FIG. 2, spacer ring 16 may act as an initial seal mechanism by being mounted on a shoulder to provide an initial position for spacer ring 16. Accordingly, spacer ring 16 may be sized to urge metal seal ring 14 against energizing ring 12 to provide an initial seal without pressure being present as discussed in more detail hereinafter. Thus, the present invention provides for a seal that is always effective low pressure as well as high pressures.

In one embodiment as best shown in FIG. 3, seal ring 14 defines metal groove 18 which separates inner wing 20 and outer wing 22, which are resiliently flexible. Many components of metal seal ring 14 and 14A may be substantially the same, and therefore are numbered the same in either FIG. 2 or FIG. 3. However, due to enlargement, some features metal seal ring 14 are more easily shown in FIG. 3. Inner wing 20 and outer wing 22 may expand and contract with respect to each other. Unlike other metal seals which comprise deformable metal, inner wing 20 and outer win 22 are comprised of a hard metal alloy which does not deform during the operational range of movement, but instead may be arranged to allow inner wing 20 and outer wing 22 to elastically or resiliently flex with changing pressure requirements.

Energizing ring 12 may comprise inner and outer energizing surfaces 24 and 26 (See FIG. 2) which engage the interior surfaces 28 and 30 (See FIG. 3) of metal seal ring 14 and metal seal ring 14A. In this embodiment, inner and outer energizing surfaces 24 and 26 comprise, at least in cross-section, a flat wedging surface that when urged against mating interior surfaces 28 and 30 act to expand inner wing 20 and/or outer wing 22 and/or allow contraction. While flat mating wedging surfaces are shown in cross-section, other surfaces may be utilized such as rounded or otherwise engagable surfaces that may allow expanding and/or contraction of inner wing 20 and outer wing 22. In this embodiment, the angle of the wedging surfaces with respect to the horizontal are about 75 degrees. However, this amount may vary in one embodiment by five to ten degrees or in another embodiment by twenty or thirty degrees, and/or may be varied as desired. Energizing ring 12 engages sealing ring 14 to produce an initial seal. A force is applied by energizing surfaces 24 and/or 26 to expand inner wing 20 and outer wing 22 with respect to each other, which then engage corresponding metal surfaces to create a seal.

The force may vary due to differential pressure acting on surfaces 28 and 30 to provide a corresponding expansion of inner wing 20 and outer wing 22. If the differential pressure decreases, the force will decrease and inner wing 20 and outer wing 22 may thereby reduce the force acting to expand inner wing 20 and outer wing 22. Thus, depending on the desired configuration, it may not be necessary that a high sealing force be maintained at all times when a high force is not necessary to control the differential pressure. Instead, the sealing force may be adjusted to the differential pressures. This provides a long-lasting, reliable seal assembly that tightly seals even very high pressures, but which avoids the need for extremely tight tolerances for a high pressure metal-to-metal seal.

In one embodiment, the seal is made with line-of-contact metal-to-metal sealing. Thus, in metal seal ring 14A, multiple round protrusions 32 and 34 are formed on outer surface 36 of metal seal ring 14. In a cross-sectional view, the outermost tips of the protrusions will then engage an inner surface at what is effectively a point, because a circle makes contact with a line at a point. Because the point extends around metal seal ring 14, this creates a circular line-of-contact. Metal seal ring 14A comprises two inner seal contact points 44 and 46, on inner surface 37, and two outer seal contact points 32 and 34. Contact points 34 and 46 may be configured to engage first and points 32 and 44 may subsequently engage. The contact pressure on the different sets of round protrusions may be different or may be approximately the same depending on the design.

Figure 4:
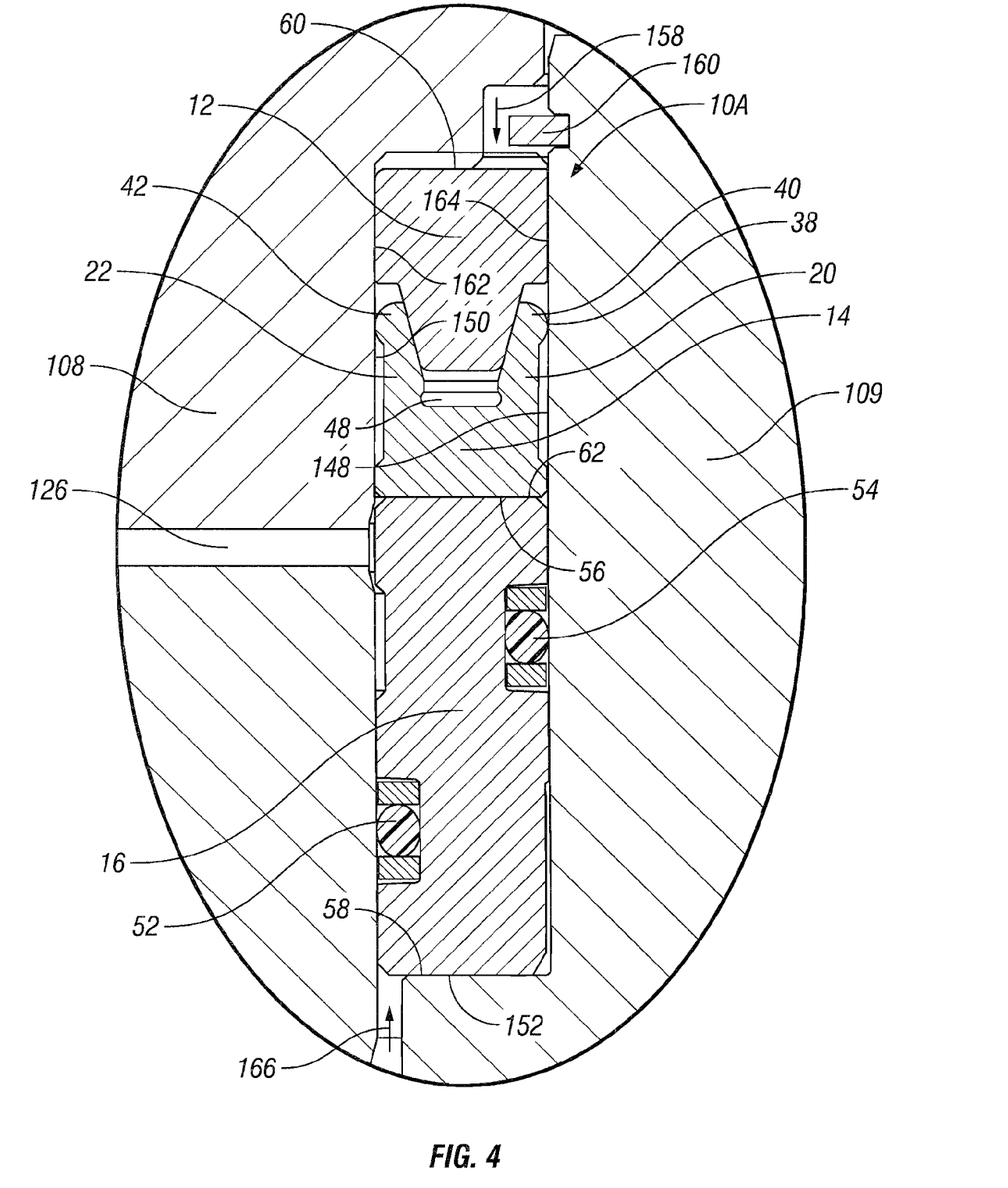
FIG. 4 is an elevational view, in cross-section, that shows an enlargement of region 4 of FIG. 1 wherein a metal-to-metal sealing ring is mounted in a wellhead device in accord with a possible embodiment of the present invention.

The point of contact is shown in cross-section in FIG. 4 at line-of-contact point 38 for protrusion 40. Thus, a line-of-contact seal is made at point 38, as shown in cross-section, between metal seal ring 14 and inner tubular wall 148. Likewise, a line-of-contact seal is made between metal seal ring 14 (or protrusion 42) and outer tubular wall 150. Inner and outer tubular walls 148 and 150 are formed within pressure control equipment 100, and essentially create a ring-shaped pocket which is utilized to hold seal assembly 10A in position.

While the geometrical concepts of points and lines are an abstraction due to an assumption that the point and lines are infinitely small, the present invention provides a practical example of real world use of these concepts to provide a sealing mechanism. Therefore these contacts are described herein as points and lines even though they are not infinitely small.

As discussed above, it will be noted that metal seal ring 14A has two outer protrusions 32 and 34 whereas metal seal ring 14 has only one outer protrusion 42. Likewise metal seal ring 14 has only one inner protrusion 40, whereas metal seal ring 14A has two inner protrusions 44 and 46. In one embodiment, for a radius of the protrusions might be in the approximate range of about 0.062 inches for a ring in the general range of 8 inches OD. However, this may vary.

The protrusions and/or other seal ring surfaces may comprise a contact surface that is overlaid with non-corrosive high strength hard alloy so that dents are not formed during operation. Thus, deformation of metal seal ring 14 and 14A is avoided.

Another possible feature of metal seal ring 14 and 14A is an undercut 48 which may be utilized to increase the flexibility of inner and outer wings 20 and 22. In one possible embodiment, undercut 48 may comprise ends with radius of 0.06 inches. However, this may be adjusted as desired. Undercut 48 is positioned about midway at the bottom of the sloping portion of groove 18. As well, inner and outer wings 20 and 22 may be made thinner or thicker depending on the desired flexibility.

Lower embodiment 50 may comprise a threaded socket to permit adjustment and/or mounting into an assembly and/or provide for easier removal. However, if desired, additional opening of groove 18 may be provided at lower portion 50 to provide even more flexibility of operation, if desired.

Figure 5:
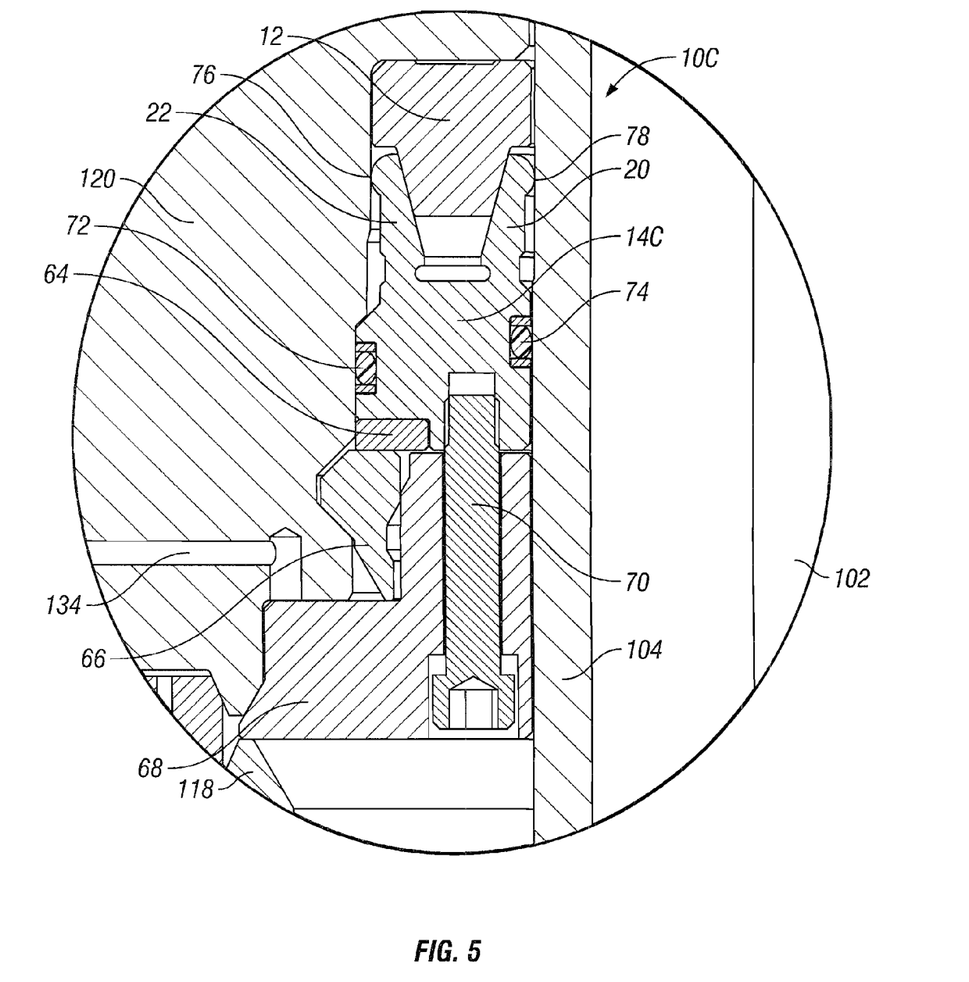
FIG. 5 is an elevational view, in cross-section, that shows an enlargement of region 5 of FIG. 1 wherein a metal-to-metal sealing ring is mounted in a wellhead device in accord with a possible embodiment of the present invention.

To provide back-up sealing, non-metallic seal rings may be utilized that may be likely to encounter lower pressures. For example, inner secondary seal ring 54 and outer secondary seal ring 52 may be utilized on spacer ring 16 as shown in FIG. 2 and FIG. 4. As another possible example, as shown in FIG. 5, inner secondary seal ring 74 and outer secondary seal ring 72 can also be utilized on an embodiment of a metal seal ring in accord with the invention, such as metal seal ring 14A. Secondary seal rings may be comprised of non-metal materials and be of different types.

As discussed above, various means may be utilized for providing an initial seal for sealing mechanisms 10A, 10B, 10C, and 10D. In one embodiment, a spacer ring, such as spacer ring 16 may be sized so as to provide sufficient force to create an initial seal once the assembly is in position within pressure control equipment 100. For example, as best shown in FIG. 4, lower surface 58 of spacer ring 16 engages shoulder 152 formed within pressure control equipment 100. Upper surface 56 of spacer ring 16 engages lower surface 62 of seal ring 14. Moreover, upper surface 60 of energizing ring 12 has limited upper movement, which results in some spreading of protrusions 40 and 42 for making an initial metal-to-metal seal. Therefore, spacer ring 16 may comprise a sufficient vertical size, as shown in FIG. 4, to urge metal seal ring 14 into sufficient engagement with energizing ring 12 to provide an initial metal-to-metal seal. Retaining ring 160 may be utilized to hold seal assembly 10A in position during assembly. As discussed above, spacer ring 16 may also be slightly moveable and may act as a piston to increase pressure against sealing ring 14.

A large differential pressure from above sealing assembly 10A, as indicated by arrow 158, will act on the interior surface of wings 20 and 22, as discussed above, providing addition force for spreading protrusions 40 and 42, and thereby increasing the sealing force applied at the line-of-contact seal. The large differential pressure may pass by energizing ring sidewalls 162 and 164 to engage surfaces 28 and 30 (see FIG. 3) of sealing ring 14. Energizing ring sidewalls 162 and 164 may have a tolerance in the range of about five thousandths of an inch for sliding engagement with inner tubular wall 148 and outer tubular wall 150. Likewise, as discussed above, pressure from below sealing ring assembly 10A, as indicated by arrow 166 might be sufficient to urge spacer ring 16 upwardly and increase the sealing force.

In FIG. 5, an enlarged view of sealing assembly 10C is shown. In this embodiment, a different initial seal mechanism is utilized. In this embodiment, seal protector ring 64, locking ring 66, compression ring 68, and/or screw 70 may be utilized to create an initial seal. In this embodiment, the assembly may be held in position during assembly by locking ring 66 and screw 70. If the vertical height of compression ring 68 is not sufficient to produce an initial metal-to-metal seal, as discussed above in connection with spacer ring 16 operation, then screw 70 may be utilized to provide an additional initial metal-to-metal seal adjustment. Moreover, an additional lockdown screw assembly may be utilized, as discussed subsequently in conjunction with seal ring 10D.

In operation, sealing assembly 10C as shown in FIG. 5, may function similarly to that of seal assembly 10A. A high pressure above seal assembly 10C, will create a differential pressure across seal assembly 10C that will urge additional expansion or spreading force acting on an interior of inner and outer wings 20 and 22 and thereby increase the seal force produced by metal seal ring 14C. Line-of-contact metal-to-metal seals are made at 78 and 76. As noted above in this embodiment, inner secondary seal 74 and outer secondary seal 72 are provided on metal seal ring 14C.

Figure 6:
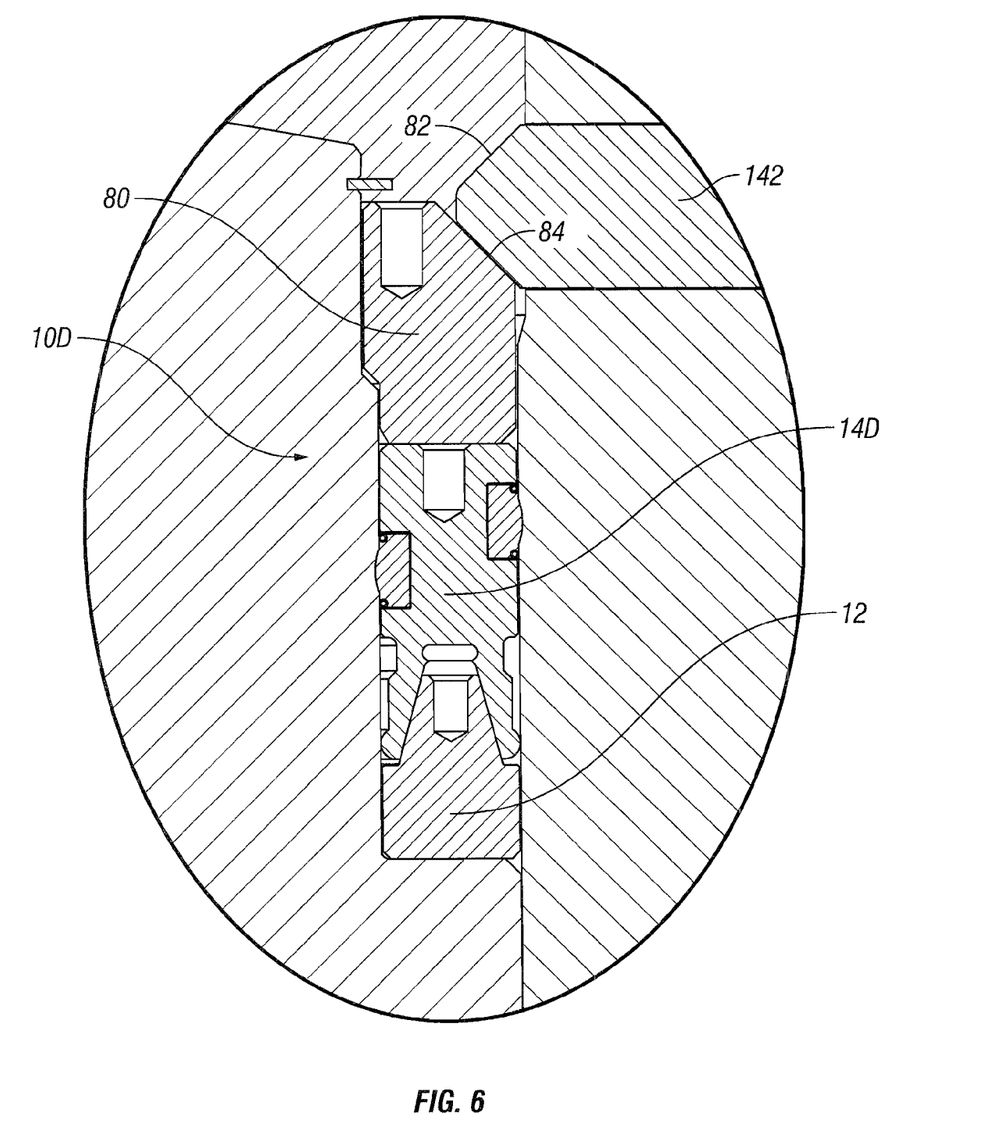
FIG. 6 is an elevational view, in cross-section, that shows an enlargement of region 6 of FIG. 1 wherein a metal-to-metal sealing ring is mounted in a wellhead device in accord with a possible embodiment of the present invention.

Sealing assembly 10D may utilize wedging surfaces 82 and 84 to engage spacing ring 80 which urges sealing ring 14D into engagement with energizing ring 12. Wedging surfaces 82 and 84 may be activated by lockdown screw assembly 142 to force sealing ring 14D into engagement with energizing ring 12 with a desired force for sealing. Thus, the sealing force can be adjusted if necessary. For instance, if pressure is detected across the seal, such at a test port, then addition sealing force may be applied.

In summary of general operation of a seal ring assembly, energizing ring 12 is urged against the sealing ring to spread the wings of the sealing ring whereby a metal-to-metal seal created. A spacer ring may be utilized to urge energizing ring into engagement with the sealing ring. The spacer ring may be sized to produce a desired force. The spacer ring may act as a piston that increases force with increasing differential pressure. Other means for urging energizing ring against seal ring may comprise bolts, locking mechanisms, and the like, some possible specific examples of which are illustrated herein.

In general, it will be understood that such terms as "up," "down," "vertical," "upper," "lower," "above", "below", and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. One of skill in the art upon reviewing this specification will understand that the relative size and shape of the components may be greatly different from that shown and the invention can still operate in accord with the novel principals taught herein. While inner and outer seals are created as shown above, only an inner or outer seal might be created in accord with the present invention.

Accordingly, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A metal seal assembly insertable into an annular recess, said annular recess comprising inner and outer annular recess walls, comprising:
    a rigid energizing metal ring comprising at least two energizing ring angled wedging energizing wall surfaces;
    a single metal sealing ring which defines a groove with at least two sealing ring angled wedging wall surfaces each being oriented at mating angles to said at least two energizing ring angled wedging energizing wall surfaces for mating with said at least two energizing ring angled wedging energizing wall surfaces to provide a sliding wedging interaction along a length of said at least two energizing ring angled wedging energizing wall surfaces and said two sealing ring angled wedging wall surfaces to thereby urge an inner wing and an outer wing of said metal sealing ring to expand with respect to each other so as to be operable to produce an inner metal-to-metal seal and an outer metal-to-metal seal;
    at least one rounded protrusion on each of said inner wing and said outer wing for engagement with said inner and outer annular recess walls without embedding into said inner and outer annular recess wall to produce said inner metal-to-metal seal and said outer metal-to-metal seal;
    an initial seal mechanism positioned to engage at least one of said energizing metal ring and said metal sealing ring with sufficient force to form an initial metal-to-metal seal;
    said initial seal mechanism comprising a metal ring without wedging surfaces and threads;
    said metal ring positioned on an opposite end of the metal sealing ring from said energizing metal ring;
    said metal ring comprising a substantially first flat distal end and a substantially second flat distal end opposite the substantially first flat distal end; and
    said metal sealing ring having a substantially flat end that contacts with the first flat distal end of the metal ring of said initial seal mechanism.

2. The apparatus of claim 1 wherein said inner wing and said outer wing are responsive to a differential pressure across said metal sealing ring to urge said inner wing to expand and contract with respect to said differential pressure.

3. The apparatus of claim 1 wherein said metal sealing ring comprises an inner wall thickness for said inner wing and an outer wall thickness for said outer wing, said inner metal wall thickness and said outer metal wall thickness defining a socket with threads.

4. The apparatus of claim 1 wherein said third metal ring is sized to produce said initial metal-to-metal seal when engaging at least one of said energizing metal ring and said metal sealing ring.

5. The apparatus of claim 1 wherein said third metal ring comprises at least one seal ring mounted on said third metal ring.

6. The apparatus of claim 1 wherein said at least two energizing ring angled energizing wall surfaces comprises conical wedging surfaces when viewed in a cross-section.

7. The apparatus of claim 1 wherein said at least two energizing ring angled energizing wall surfaces comprises flat wedging surfaces when viewed in a cross-section.

8. The apparatus of claim 1 wherein said at least one rounded protrusion comprises a hard metal alloy.

9. The apparatus of claim 1 wherein said metal sealing ring is resilient for repeatable sealing.

10. The apparatus of claim 1 wherein said inner metal-to-metal seal and said outer metal-to-metal seal comprise line of contact seals with a radius in the range of 0.062.

11. The apparatus of claim 1, further comprising an undercut portion which extends laterally outwardly away from said at least two sealing ring angled wedging wall surfaces of said metal sealing ring.

12. The apparatus of claim 1 wherein said metal sealing ring comprises an inner wall thickness for said inner wing and an outer wall thickness for said outer wing, said inner metal wall thickness and said outer metal wall thickness defining an undercut portion at a mid section of said metal sealing ring to thereby increase flexibility of said inner wing and said outer wing.

* * * * *